(12) United States Patent
Sanami

(10) Patent No.: US 7,927,393 B2
(45) Date of Patent: Apr. 19, 2011

(54) AIR CLEANER ELEMENT

(75) Inventor: Yoshihisa Sanami, Kariya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 260 days.

(21) Appl. No.: 12/356,820

(22) Filed: Jan. 21, 2009

(65) Prior Publication Data
US 2009/0188219 A1  Jul. 30, 2009

(30) Foreign Application Priority Data

Jan. 25, 2008  (JP) .................. 2008-015382

(51) Int. Cl.
*B01D 50/00* (2006.01)
(52) U.S. Cl. ............. 55/385.3; 55/418; 55/484; 55/502; 55/521
(58) Field of Classification Search .......... 55/309, 55/385.3, 418, 484, 502, 521
See application file for complete search history.

(56) References Cited

U.S. PATENT DOCUMENTS

| | | | |
|---|---|---|---|
| 5,144,797 A * | 9/1992 | Swars .............................. | 60/299 |
| 7,097,817 B2 * | 8/2006 | Brisley et al. ............. | 423/245.3 |

| | | | |
|---|---|---|---|
| 2006/0283426 A1 | 12/2006 | Oda et al. | |
| 2007/0022880 A1 | 2/2007 | Mizutani et al. | |
| 2007/0113740 A1 | 5/2007 | Oda | |
| 2008/0216455 A1 | 9/2008 | Aizawa et al. | |
| 2008/0257160 A1 | 10/2008 | Yoshida et al. | |

FOREIGN PATENT DOCUMENTS

| | | |
|---|---|---|
| JP | 2-127766 | 10/1990 |
| JP | 2-129231 | 10/1990 |
| JP | 2003-514178 | 4/2003 |
| WO | 01/34270 | 5/2001 |

* cited by examiner

*Primary Examiner* — Robert A Hopkins
(74) *Attorney, Agent, or Firm* — Greenblum & Bernstein, P.L.C.

(57) ABSTRACT

An air cleaner element includes an element body, which filters an air flow, and a guard member secured to the element body. The air flow is introduced into the element body through a first end surface of the element body. The air flow is then filtered and sent out from a second end surface. The guard member has a leg portion, which is secured to an outer circumferential portion of the first end surface of the element body. The guard member projects toward the upstream side of the air flow and includes guard portions which are connected together at the distal ends of the guard portions. The guard portions function as a handle when the element body is removed or installed and as a blockage portion that prevents large-sized foreign matter from entering the element body.

9 Claims, 5 Drawing Sheets

AIR CLEANER ELEMENT

BACKGROUND OF THE INVENTION

The present invention relates to an air cleaner element that filters air drawn to, for example, an internal combustion engine.

Conventionally, this type of air cleaner element includes a honeycomb-shaped filter element, as disclosed in, for example, Japanese National Phase Patent Publication No. 2003-514178 (first prior art), Japanese Laid-Open Utility Model Publication No. 2-127766 (second prior art), and Japanese Laid-Open Utility Model Publication No. 2-129231 (third prior art). In the element of these prior arts, an element body is removably mounted in a casing of an air cleaner through a seal member. An air flow is introduced from a first end surface of the element body into the element body. The air flow is then filtered and sent out from a second end surface of the element body.

In the first prior art, a core member is embedded in the center of the element body. A handle is formed at an end of the core member and projects from one of the end surfaces of the element body. To selectively remove and mount the element body, the handle is gripped and the element body is removed from or inserted into the casing of the air cleaner.

In the second prior art, a dust trapping portion is formed in a casing of an air cleaner in such a manner that the dust trapping portion is arranged adjacent to a first end surface of an element body and at an upstream side of an air flow. The dust trapping portion traps large-sized foreign matter such as leaves if the foreign matter enters the casing of the air cleaner. The foreign matter is thus prevented from proceeding toward the first end surface of the element body. This suppresses blockage of the first end surface of the element body by the foreign matter.

In the third prior art, a pre-filter formed by a sponge or a non-woven fabric is secured to a casing of an air cleaner in such a manner that the pre-filter is located adjacent to a first end surface of an element body and at an upstream side of an air flow. The air flow is preliminarily filtered by the pre-filter.

However, the configurations of these prior arts have the following problems. Specifically, in the first prior art, the handle is gripped by the operator when the element body is removed from or secured to the casing. The element body and the core member having the handle must be bonded to each other with high strength in order to resist the friction force based on sealing pressure between the element body and the casing. Accordingly, reinforcement must be provided between the element body and the casing so as to improve the bonding strength. This disadvantageously complicates the manufacture of the element.

Also, in the first prior art, the first end surface of the element body is open to the upstream side of the interior of the casing of the air cleaner without being protected by a guard. As a result, if large sized foreign matter enters the casing, the foreign matter easily reaches the first end surface of the element body and blocks the first end surface. This decreases the amount of air flow that passes through the air cleaner, thus increasing the flow resistance of the air flow and lowering filtering performance of the air cleaner.

Further, in the second and third prior arts, the dust trapping portion or the pre-filter must be incorporated in the casing of the air cleaner. This complicates the configuration of the air cleaner and increases the number of the components. In the third prior art, the pre-filter may be clogged quickly. In this case, as in the first prior art, the flow resistance of the air flow may increase and the filtering performance of the air cleaner drops.

BRIEF SUMMARY OF THE INVENTION

Accordingly, it is an objective of the present invention to provide a simply configured air cleaner element that functions as a handle when an element body is removed or mounted, and prevents a large sized foreign matter from entering the element body while maintaining high filtering performance.

To achieve the foregoing objective and in accordance with one aspect of the present invention, an air cleaner element that filters an air flow is provided. The air cleaner element includes an element body and a guard member. The element body has a first end surface and a second end surface, and filters the air flow. The air flow is introduced from the first end surface, filtered by the element body, and then sent out from the second end surface. The guard member is provided at an upstream side of the first end surface of the element body. The guard member has a leg portion secured to an outer circumferential portion of the first end surface and a plurality of guard portions that project toward the upstream side of the air flow of the first end surface and are connected together at distal ends thereof.

Other aspects and advantages of the present invention will become apparent from the following description, taken in conjunction with the accompanying drawings, illustrating by way of example the principles of the invention.

BRIEF DESCRIPTION OF THE SEVERAL VIEWS OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

An air cleaner element according to a first embodiment of the present invention will now be described with reference to FIGS. 1 to 3.

Figure 1:
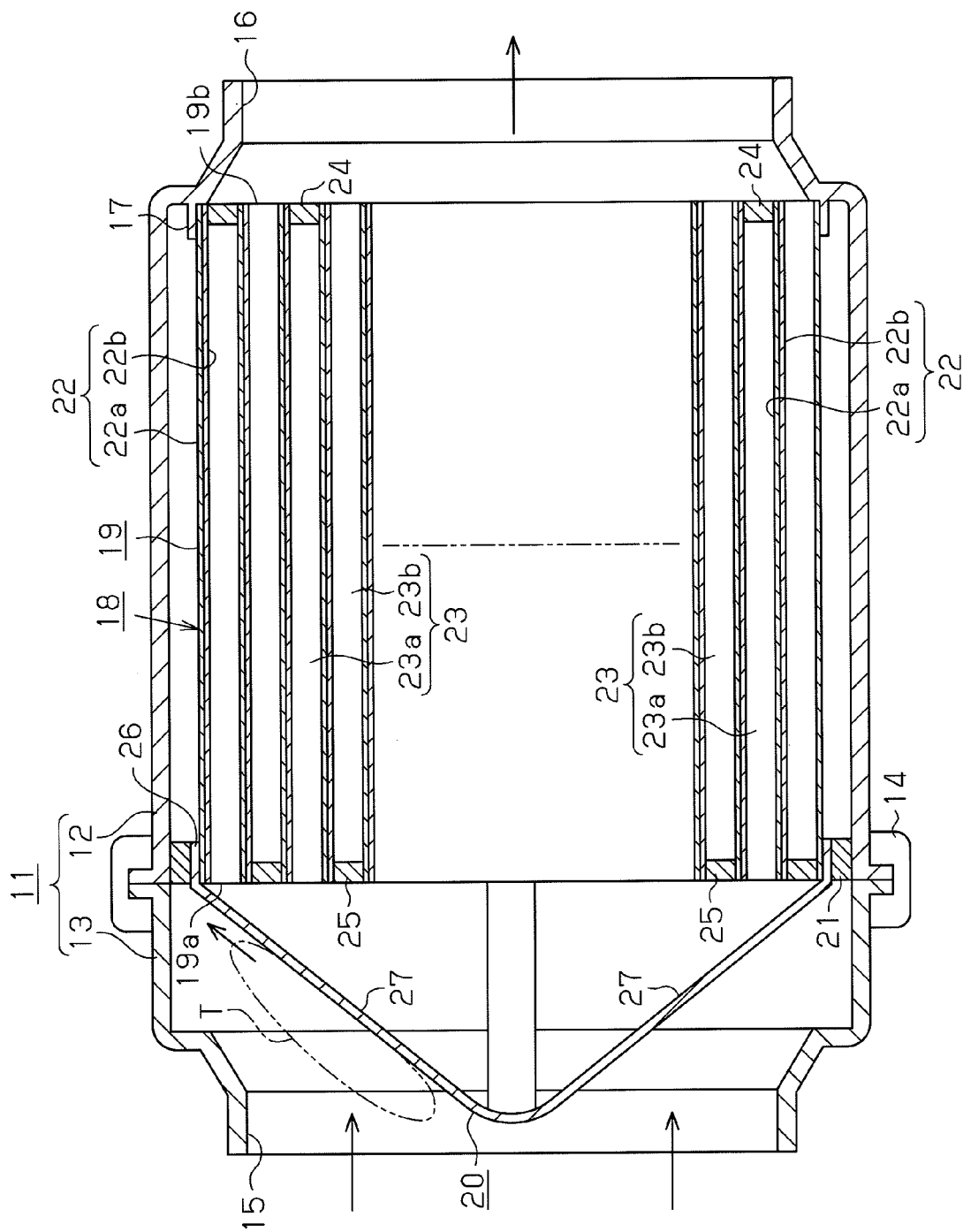
FIG. 1 is a cross-sectional view showing an air cleaner having an air cleaner element according to a first embodiment of the present invention.

As shown in FIG. 1, a casing 11 of the air cleaner includes a cylindrical casing body 12 having a large-diameter opening end and a cover 13, which is removably secured to the opening end of the casing body 12 by a clamp 14. An air inlet port 15, which communicates with the outside air, is defined in the circumferential wall of the cover 13 with the walls of the air inlet port 15 projected from the circumferential wall. An air outlet port 16, which is connected to an intake system of an engine, is defined by the circumferential wall of the casing body 12 at a position opposite to the air inlet port 15, with the walls of the air outlet port 16 projecting from the circumferential wall. A cylindrical holder 17 is formed on and projected from the inner surface of the circumferential wall of the casing body 12.

The air cleaner element 18 is removably mounted in the casing 11 while being held in a state inserted in the cylindrical holder 17 of the casing body 12. As shown in FIGS. 1 and 2, the element 18 has a cylindrical element body 19, a guard member 20 formed of synthetic resin, and an annular seal member 21. The guard member 20 is secured to an outer circumferential portion of a first end surface 19a of the element body 19. The seal member 21 is secured to the outer circumference of the proximal end of the guard member 20.

With the element body 19 secured to the casing body 12 of the casing 11, the seal member 21 is brought into tight contact with the inner circumferential surface of the opening end of the casing body 12 at the upstream side of the air flow. With the element body 19 mounted in the casing body 12, an air flow is introduced into the element body 19 from the first end surface 19a of the element body 19. After having been filtered in the element body 19, the air flow is sent out from a second end surface 19b of the element body 19.

Figure 3:
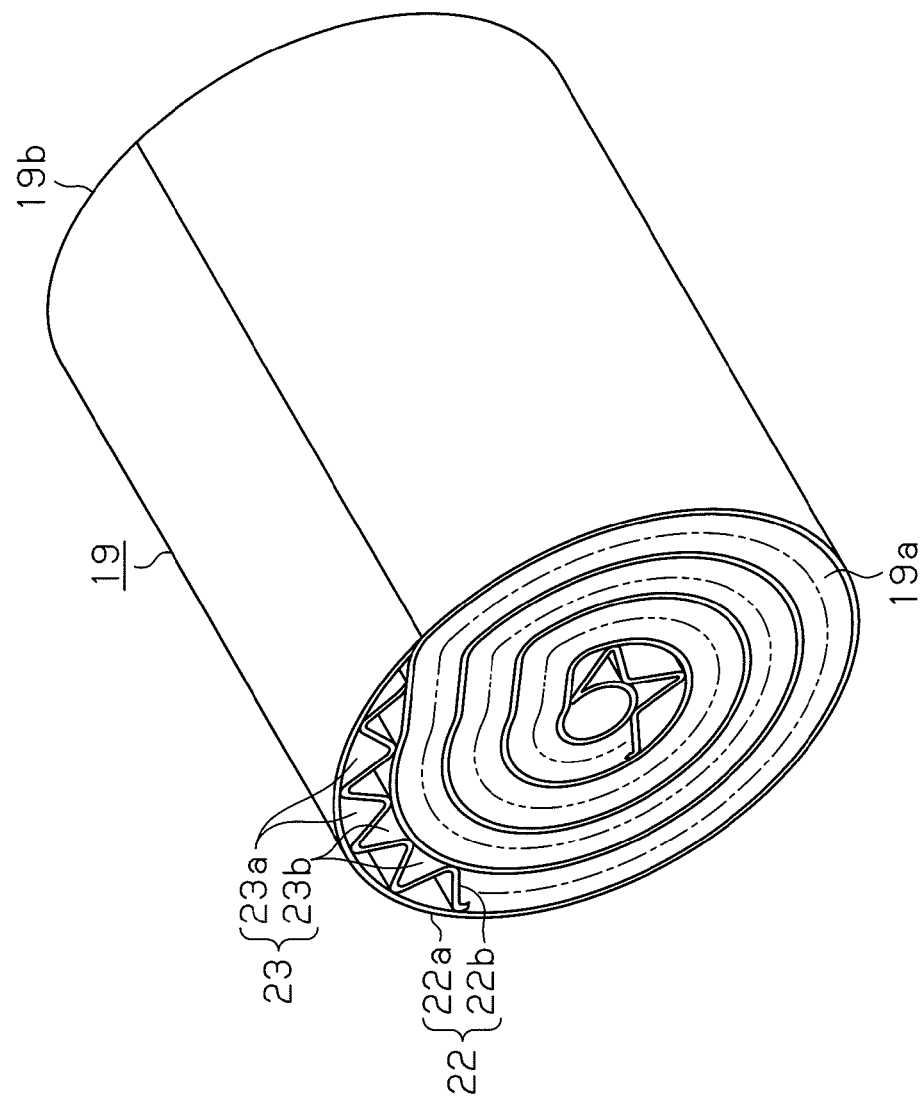
FIG. 3 is a perspective view showing an element body of the air cleaner element illustrated in FIG. 2.

With reference to FIGS. 1 and 3, the element body 19 is formed by spirally winding a laminated material 22 including a sheet-like filtering material 22a and a corrugated filtering material 22b. The element body 19 has a cylindrical honeycomb structure as a whole. A number of air passages 23 are defined between the sheet-like filtering material 22a and the corrugated filtering material 22b of the laminated material 22. The air passages 23 include first air passages 23a and second air passages 23b, which are arranged alternately. The first air passages 23a each have an opening defined in the first end surface 19a of the element body 19 corresponding to the air inlet port 15. The first air passages 23a are closed by a closing material 25 at the second end surface 19b of the element body 19. In contrast, the second air passages 23b are closed by a closing material 25 at the first end surface 19a of the element body 19 and each have an opening at the second end surface 19b of the element body 19.

After having been introduced into the casing 11 from the air inlet port 15, the air is sent to the first air passages 23a from the first end surface 19a of the element body 19. The air then passes through the sheet-like filtering material 22a or the corrugated filtering material 22b while being filtered by the sheet-like filtering material 22a or the corrugated filtering material 22b. Afterwards, the air is passed through the second air passages 23b and sent out from the second end surface 19b of the element body 19. The air is then released to the exterior of the casing 11 through the air outlet port 16.

Figure 2:
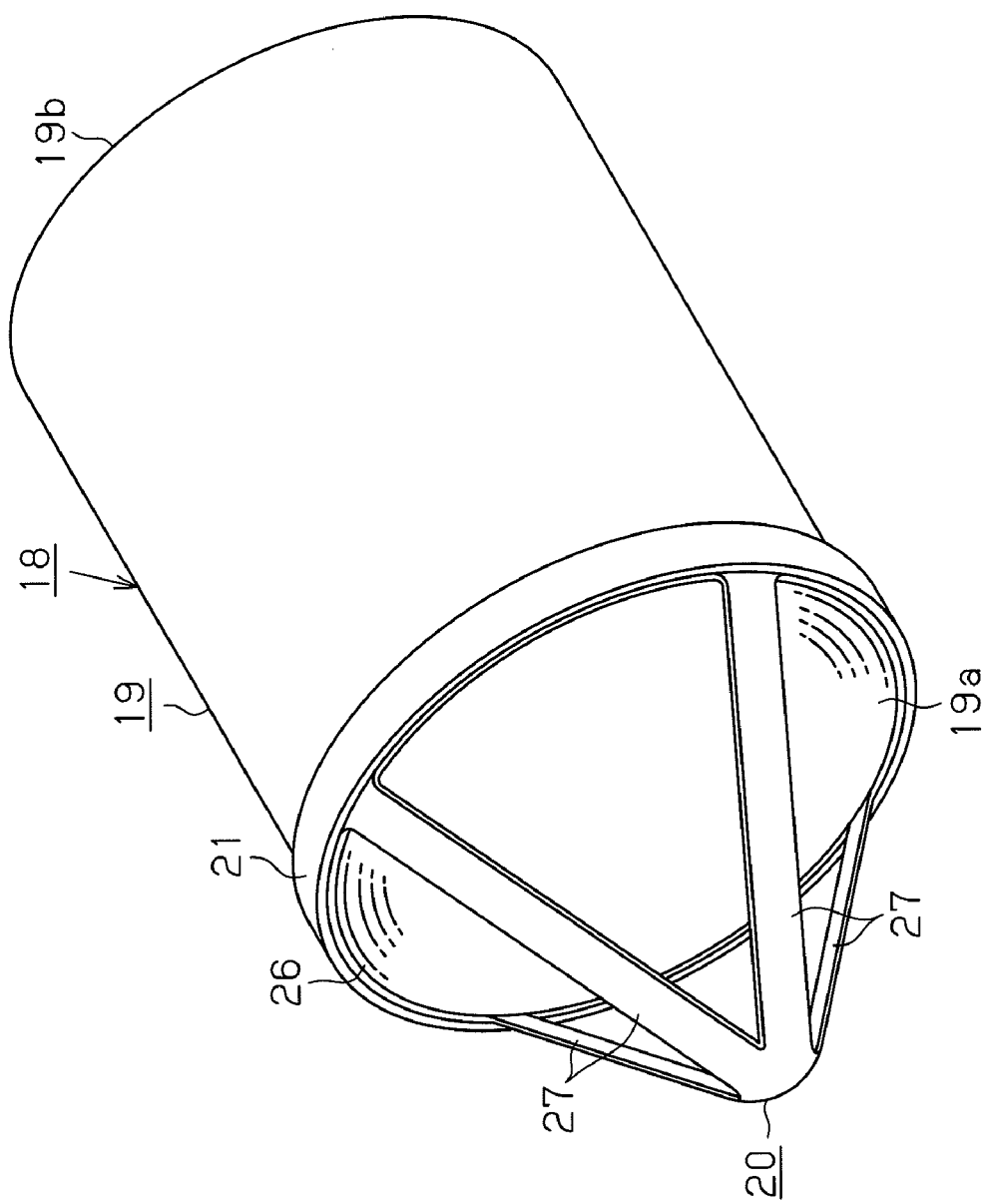
FIG. 2 is a perspective view showing the air cleaner element illustrated in FIG. 1.

As shown in FIGS. 1 and 2, the guard member 20 has an annular leg portion 26 and a plurality of (in the first embodiment, four) guard portions 27, each of which extends from the leg portion 26 in an upstream direction of the air flow. The guard portions 27 are spaced at equal intervals along the circumference of the leg portion 26. The guard portions 27 are inclined in a manner converging toward the upstream side of the air flow and connected directly to one another at the distal ends of the guard portions 27. The seal member 21 is fixed to the outer circumference of the leg portion 26. The annular leg portion 26 is fitted to the outer circumference of the first end surface 19a of the element body 19 so that the guard member 20 is secured to the element body 19. It is preferred that adhesive be arranged between the leg portion 26 of the guard member 20 and the outer circumferential surface of the element body 19.

The air cleaner element, which is configured as has been described, operates in the following manner.

When the air cleaner element is used, a large-sized foreign matter T (see FIG. 1), such as a leaf, may enter the casing 11 through the air inlet port 15. In this case, the guard portions 27 of the guard member 20 prevent the foreign matter T from entering the zone surrounded by the guard portions 27. The foreign matter T thus moves in a manner following inclination of the guard portions 27 toward the outer circumference of the element body 19. The foreign matter T is thus prevented from contacting the first end surface 19a of the element body 19. As a result, the first end surface 19a of the element body 19 is prevented from being blocked by the foreign matter T.

To remove the air cleaner element 18 from the casing 11 for replacement, the clamp 14 is released first. The cover 13 is then isolated from the opening end of the casing body 12. In this state, the operator holds the guard portions 27 of the guard member 20 and draws the element body 19 from the opening end of the casing body 12 to the exterior. In this manner, the element 18 is easily isolated from inside the casing 11. Also, to mount the element 18 in the casing body 12, the operator holds the guard portions 27 of the guard member 20 so that the element 18 is easily installed.

In the first embodiment, the seal member 21 is secured to the outer circumference of the leg portion 26, which is formed integrally with the guard portions 27 of the guard member 20. The element body 19 is installed while being held in tight contact with the inner side of the casing body 12 through the seal member 21. Despite the fact that the element body 19 is reliably mounted in the casing body 12 in this manner, the seal member 21 is easily released from the state tightly contacting the casing body 12 by holding and drawing the guard portions 27 of the guard member 20. As a result, the element 18 is easily removed from the casing body 12 or inserted into the casing body 12 with small force.

Accordingly, the air cleaner element of the first embodiment has the following advantages.

(1) The single guard member 20, which is secured to the element body 19, functions as a handle by means of which the element body 19 is selectively secured and mounted, and prevents large-sized foreign matter from entering the element body 19. This simplifies the configuration of the air cleaner element, thus decreasing the number of the components.

(2) The seal member 21 is arranged on the leg portion 26 of the guard member 20, which functions as a handle. As a result, the element 18 is selectively mounted and removed without deforming or damaging the element body 19 regardless of high sealing pressure. In other words, the sealing pressure generated by the seal member 21 can be raised so that the air is effectively prevented from flowing downstream through the seal member 21 without being filtered.

(3) The guard portions 27 of the guard member 20 are inclined in a manner converging toward the upstream side of the air stream. This moves the large-sized foreign matter T, which has entered the casing 11 of the air cleaner, in a manner following the inclination of the guard portions 27 of the guard member 20 toward the outer circumference of the element body 19. This effectively prevents the first end surface 19a of the element body 19 from being blocked by the large-sized foreign matter T.

Second Embodiment

A second embodiment of the present invention will hereafter be explained mainly on the difference between the second embodiment and the first embodiment.

Figure 4:
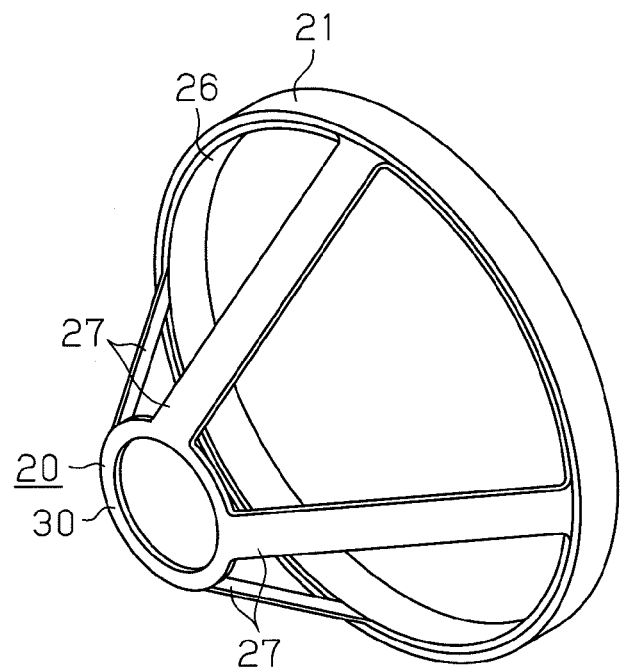
FIG. 4 is a perspective view showing a guard member of an air cleaner element according to a second embodiment of the present invention.

As illustrated in FIG. 4, a ring 30 is formed at the distal end of the guard member 20 and the distal end of each guard portion 27 is connected to the ring 30. The outer diameter of the ring 30 is smaller than the outer diameter of the first end surface 19a of the element body 19.

Accordingly, the air cleaner element of the second embodiment has advantages substantially equivalent to those of the first embodiment. The second embodiment additionally has the following advantage.

(4) The connecting portion of the distal ends of the guard portions 27 is the ring 30. The air passes through the space surrounded by the ring 30. This reduces the flow resistance of the air at the connecting portion of the distal ends of the guard portions 27.

Third Embodiment

Figure 5:
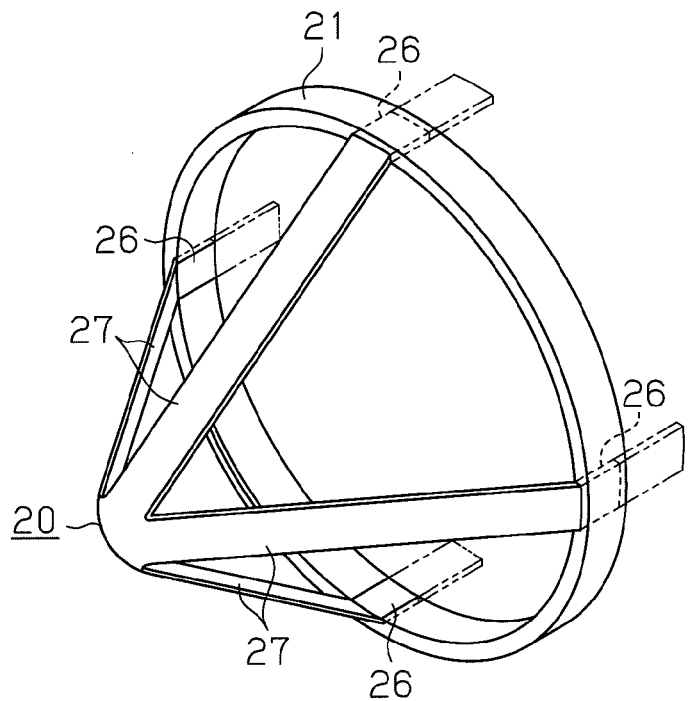
FIG. 5 is a perspective view showing a guard member of an air cleaner element according to a third embodiment of the present invention.

As shown in FIG. 5, an air cleaner element according to a third embodiment of the present invention includes a plurality of leg portions 26, which are formed integrally with the proximal portions of the corresponding guard portions 27 and provided separately from one another, without being connected together in an annular shape. The seal member 21 is secured to the outer circumferences of the leg portions 26 in such a manner that the leg portions 26 are connected together.

The third embodiment has the following advantage.

(5) The leg portions 26 of the guard member 20 are provided as separate components without being connected together. This configuration reduces the weight of the guard member 20.

Fourth Embodiment

Figure 6:
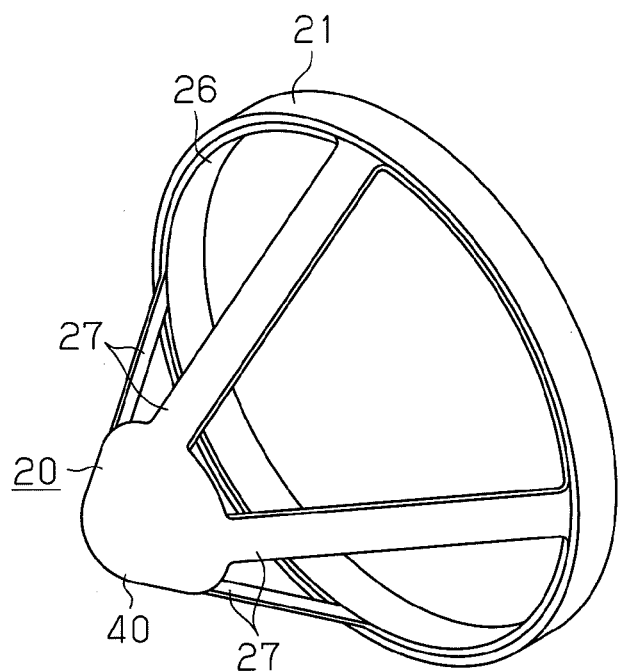
FIG. 6 is a perspective view showing a guard member of an air cleaner element according to a fourth embodiment of the present invention.

As illustrated in FIG. 6, in the fourth embodiment, a nose body 40 having a substantially conical or dome-like shape is formed at the distal end of the guard member 20. The guard portions 27 are connected integrally with the nose body 40.

The fourth embodiment has the following advantage.

(6) Since the nose body 40 effectively regulates the air flow, filtering efficiency of the air flow is enhanced.

Fifth Embodiment

Figure 7:
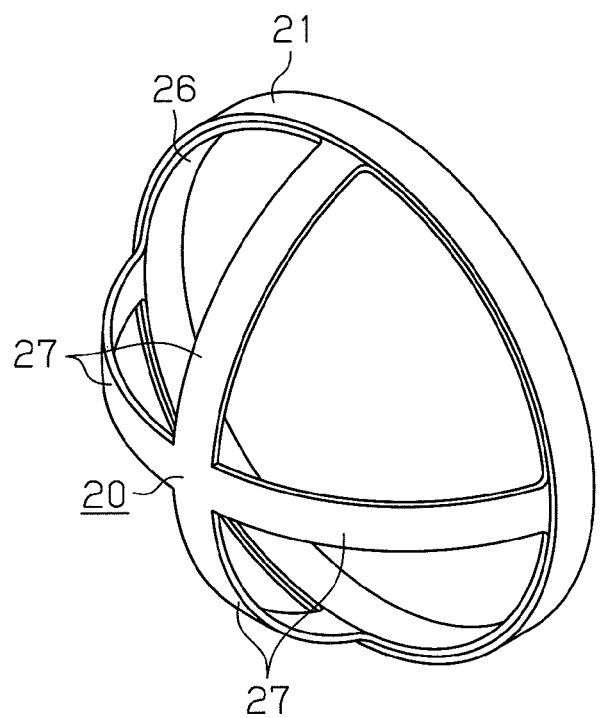
FIG. 7 is a perspective view showing a guard member of an air cleaner element according to a fifth embodiment of the present invention.

With reference to FIG. 7, in the fifth embodiment, each guard portion 27 of the guard member 20 has an arcuate shape. The guard member 20 is formed along a semisphere.

As a result, the fifth embodiment has advantages substantially equivalent to the advantages of the first embodiment.

Modifications

The illustrated embodiments may be modified as follows.

In each of the illustrated embodiments, the element body 19 may be formed in any suitable shape, such as a rectangular column-like shape, other than the cylindrical shape. In this case, the leg portion 26 of the guard member 20 is formed along the outer peripheral surface of the rectangular cylinder.

In the second and fourth embodiments, the multiple separate leg portions 26 may be employed as in the third embodiment.

In the third and fourth embodiments, the ring 30 or the nose body 40 may be provided as a separate body from the guard portions 27. In these cases, the distal ends of the guard portions 27 are welded or bonded to the ring 30 or the nose body 40, which is an independent component.

In each of the illustrated embodiments, the number of the guard portions 27 may be changed as needed. The number of the guard portions 27 may be three or two, or five or more.

In each of the illustrated embodiments, each guard portion 27 may be formed by a porous body such as a mesh body.

In the third embodiment, as indicated by the double dotted chain lines in FIG. 5, the leg portions 26 of the guard portions 27 may be extended in such a manner as to project rearward from the seal member 21.

Therefore, the present examples and embodiments are to be considered as illustrative and not restrictive and the invention is not to be limited to the details given herein, but may be modified within the scope and equivalence of the appended claims.

What is claimed is:

1. An air cleaner element that filters an air flow, comprising:
    an element body that has a first end surface and a second end surface, and filters the air flow, wherein the air flow is introduced from the first end surface, filtered by the element body, and then sent out from the second end surface; and
    a guard member that is provided at an upstream side of the first end surface of the element body,
    wherein the guard member has a leg portion secured to an outer circumferential portion of the first end surface and a plurality of guard portions that project toward the upstream side of the air flow of the first end surface and are connected together at distal ends thereof.

2. The air cleaner element according to claim 1, wherein the element of the air cleaner is accommodated in an air cleaner casing, and wherein a seal member that seals the space between the element body and the casing accommodating the element body is arranged at the outer circumference of the leg portion of the guard member.

3. The air cleaner element according to claim 1, wherein the guard portions of the guard member are inclined in a manner converging toward the upstream side of the air flow.

4. The air cleaner element according to claim 3, wherein the distal ends of the guard portions of the guard member are connected directly to one another.

5. The air cleaner element according to claim 3, wherein the guard member has a ring provided at a distal end of the guard member, the distal ends of the guard portions being connected together by the ring, and wherein the element body has a predetermined outer diameter, the ring having an outer diameter smaller than the outer diameter of the element body.

6. The air cleaner element according to claim 3, wherein the guard member has a conical nose body arranged at a distal end of the guard member, the distal ends of the guard portions being connected together by the nose body.

7. The air cleaner element according to claim 3, wherein each guard portion is formed by a flat plate material, and wherein the guard member forms a conical shape as a whole.

8. The air cleaner element according to claim 3, wherein each guard portion has an arcuate shape, and wherein the guard member is formed along a semisphere.

9. The air cleaner element according to claim 3, wherein the leg portion is one of a plurality of leg portions provided separately in correspondence with the guard portions, and wherein the leg portions are spaced at equal intervals at the outer circumferential portion of the first end surface.

* * * * *